United States Patent
Tomaschitz et al.

(10) Patent No.: US 12,540,861 B2
(45) Date of Patent: Feb. 3, 2026

(54) METHOD FOR TEMPERATURE MEASUREMENT AND TEMPERATURE MEASURING ARRANGEMENT

(71) Applicant: Infineon Technologies AG, Neubiberg (DE)

(72) Inventors: Philipp Daniel Tomaschitz, Villach (AT); Christoph Rhinow, Villach (AT)

(73) Assignee: Infineon Technologies AG, Neubiberg (DE)

( * ) Notice: Subject to any disclaimer, the term of this patent is extended or adjusted under 35 U.S.C. 154(b) by 716 days.

(21) Appl. No.: 17/817,297

(22) Filed: Aug. 3, 2022

(65) Prior Publication Data
US 2023/0048597 A1     Feb. 16, 2023

(30) Foreign Application Priority Data
Aug. 10, 2021   (DE) .......................... 102021120721.5

(51) Int. Cl.
  *H03K 5/24*  (2006.01)
  *G01K 3/00*  (2006.01)
  *G01K 7/00*  (2006.01)
(52) U.S. Cl.
  CPC ............. *G01K 3/00* (2013.01); *G01K 7/00* (2013.01); *H03K 5/24* (2013.01)
(58) Field of Classification Search
  None
  See application file for complete search history.

(56) References Cited

U.S. PATENT DOCUMENTS

| | | | | |
|---|---|---|---|---|
| 11,852,544 B2* | 12/2023 | Machavolu | ............ | G01K 7/206 |
| 11,965,783 B2* | 4/2024 | Tu | ............. | G01K 7/00 |
| 12,061,125 B2* | 8/2024 | Hu | ........... | G01K 7/425 |
| 2003/0123522 A1 | 7/2003 | Hsu et al. | | |
| 2006/0153277 A1 | 7/2006 | Yoshida | | |
| 2010/0046311 A1* | 2/2010 | Macerola | ............. | G01K 7/01 |
| | | | | 365/211 |

OTHER PUBLICATIONS

Bakker et al., "Micropower CMOS Smart Temperature Sensor", ESSCIRC '95: Twenty-first European Solid-State Circuits Conference, Sep. 1995, pp. 238-241.
Pertijs et al., "Precision Temperature Sensors in CMOS Technology", Springer, Dec. 2006, 307 pp.
Makinwa, "Smart temperature sensors in standard CMOS", vol. 5, Procedia Engineering, Sep. 5, 2010, pp. 930-939.

* cited by examiner

*Primary Examiner* — Cassandra F Cox
(74) *Attorney, Agent, or Firm* — Shumaker & Sieffert, P.A.

(57) ABSTRACT

A method for temperature detection and an electronic circuit for temperature detection are described. The method comprises providing a first temperature-dependent signal (Vctat) having a first temperature coefficient; providing a second temperature-dependent signal (Iptat) having a second temperature coefficient; generating a plurality of comparison signals (Vptat(1)-Vptat(n)) on the basis of the second temperature-dependent signal (Iptat), wherein each of the plurality of comparison signals Vptat(i)) represents a respective temperature (T(1)-T(n)); comparing the first temperature-dependent signal (Vctat) with at least one of the plurality of comparison signals (Vptat(1)-Vptat(n)); and outputting temperature information (TEMP) on the basis of the comparing.

16 Claims, 8 Drawing Sheets

METHOD FOR TEMPERATURE MEASUREMENT AND TEMPERATURE MEASURING ARRANGEMENT

This Application claims priority to German Application Number 102021120721.5, filed on Aug. 10, 2021, the entire content of which is incorporated herein by reference.

Detecting the temperature as exactly as possible is highly relevant in many technical fields. For example in circuits in which electronic power switches, such as e.g. power transistors, are used for switching loads, the temperature of the power switch may yield important information about the state of the power switch or of the load connected thereto. If the temperature rises above a predefined threshold, for example, then this may indicate a defect of the power transistor, such as, for example, an excessively high on resistance, or a defect in the load, such as, for example, an excessively high current consumption.

In principle, electronic temperature measurement can be carried out by generating a temperature-dependent signal, which is compared with a plurality of temperature-independent reference signals which are generated by means of a bandgap reference circuit, for example, and each of which represents a comparison temperature. Said reference signals should be generated with high accuracy, which may be complex and thus cost-intensive.

The object on which the invention is based consists in providing an improved method for temperature measurement and a corresponding temperature measuring arrangement.

One example relates to a method. The method comprises providing a first temperature-dependent signal having a first temperature coefficient, providing a second temperature-dependent signal having a second temperature coefficient, and generating a plurality of comparison signals on the basis of the second temperature-dependent signal, wherein each of the plurality of comparison signals represents a respective temperature. The method additionally comprises comparing the first temperature-dependent signal with at least one of the plurality of comparison signals and outputting temperature information on the basis of the comparing.

A further example relates to an electronic circuit. The electronic circuit comprises a temperature sensor configured to provide a first temperature-dependent signal having a first temperature coefficient, and to provide a second temperature-dependent signal having a second temperature coefficient. The electronic circuit additionally comprises a converter configured to generate a plurality of comparison signals on the basis of the second temperature-dependent signal, wherein each of the plurality of comparison signals represents a respective temperature, and an evaluation circuit configured to compare the first temperature-dependent signal with at least one of the plurality of comparison signals and to output temperature information on the basis of the comparing.

Examples are explained below with reference to drawings. The drawings serve to illustrate specific principles, and so only aspects that are necessary for understanding these principles are presented. The drawings are not true to scale.

In the drawings, the same reference signs designate identical features. It goes without saying that the features of the various exemplary embodiments described herein can be combined with one another, unless explicitly indicated otherwise.

Figure 1:
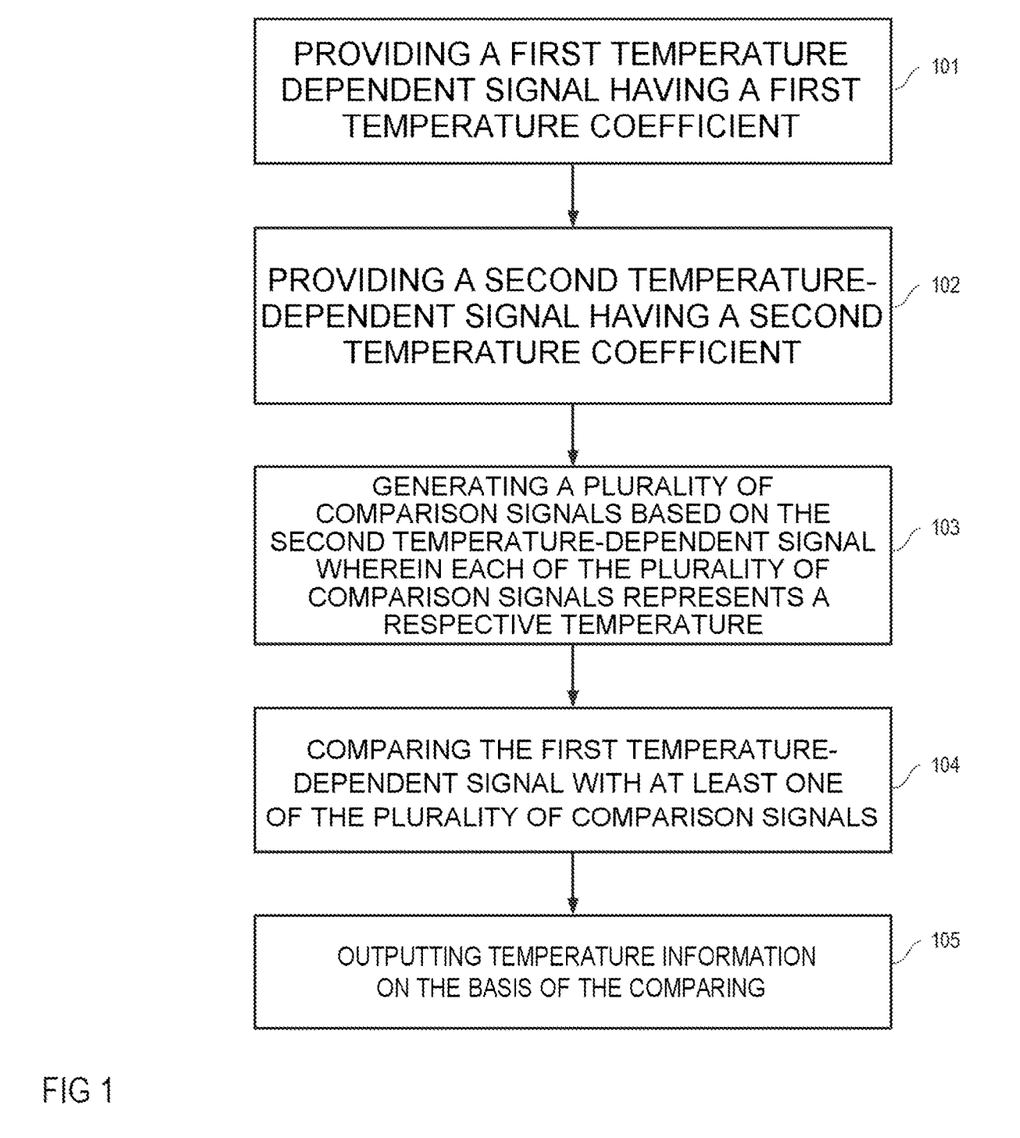
FIG. 1 illustrates a flow diagram of one example of a method for temperature detection.

FIG. 1 shows a flow diagram of a method for temperature measurement in accordance with one example. This method comprises providing a first temperature-dependent signal having a first temperature coefficient (101) and providing a second temperature-dependent signal having a second temperature coefficient (102). The method additionally comprises generating a plurality of comparison signals on the basis of the second temperature-dependent signal, wherein each of the plurality of comparison signals represents a respective temperature (103); comparing the first temperature-dependent signal with at least one of the plurality of comparison signals (104); and outputting temperature information on the basis of the comparing.

The first and second temperature coefficients differ from one another. In accordance with one example, the first and second temperature coefficients have opposite signs, i.e. one of the two temperature coefficients is positive and the other of the two temperature coefficients is negative. However, this is just one example. It is also possible to generate the first and second temperature-dependent signals in such a way that their temperature coefficients have the same sign, such that both temperature coefficients are positive or both temperature coefficients are negative, but have different magnitudes.

As explained above, each of the comparison signals represents a respective temperature, which is also referred to hereinafter as comparison temperature. In accordance with one example, the comparison signals are chosen such that the comparison temperature represented by the comparison signals represent a group of equidistant temperatures. If the group of comparison temperatures comprises for example n different comparison temperatures T(1)-T(n), where for example T(1) is the highest and T(n) is the lowest of the comparison temperatures T(1)-T(n), then for the remaining comparison temperatures T(2)-T(n) it holds true in each case that $$T(j)=T(j-1)-\Delta T \quad (1),$$

where j is an integer selected from 2-n (i∈[2; n]) and $\Delta T$ denotes the temperature difference between adjacent comparison temperatures of the group of comparison temperatures.

The temperature difference $\Delta T$ can be chosen depending on the respective purpose of use of the method or of an electronic temperature measuring circuit that realizes the method. In accordance with one example, the temperature difference $\Delta T$ is selected from a range of between 1 kelvin (K) and 20 K. The temperature difference $\Delta T$ determines the resolution with which a temperature measurement by means of the method is possible, which will also be explained in detail below.

The temperature measuring range is the range between the lowest comparison temperature T(n) and the highest comparison temperature T(1) and can likewise be chosen depending on the respective purpose of the method or of an electronic temperature measuring circuit that realizes the method. For applications in the automotive field, the temperature range extends for example from −40° C. to 150° C.

If the comparison signals represent equidistant comparison temperatures, then the number of comparison signals required increases if the temperature measurement range becomes larger for a given temperature different ΔT or if the temperature difference ΔT becomes smaller for a given temperature measurement range, i.e. a higher resolution is required.

Figure 2:
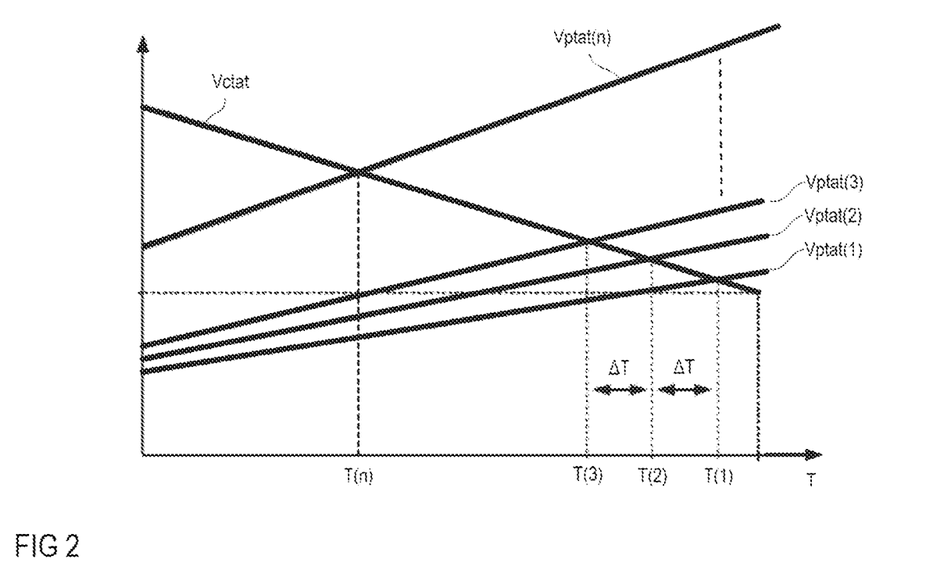
FIG. 2 illustrates, in each case verses temperature, a first temperature-dependent signal and a plurality of comparison signals derived from a second temperature-dependent signal.

FIG. 2 shows signal profiles illustrating the method in accordance with FIG. 1. FIG. 2 shows in particular signal profiles of a first temperature-dependent signal Vctat and of a plurality of comparison signals Vptat(1)-Vptat(n) in each case as a function of the temperature T. Each of the comparison signals Vptat(1)-Vptat(n) represents a corresponding comparison temperature T(1)-T(n), where hereinafter T(i) generally denotes one of the comparison temperatures T(1)-T(n) and Vptat(i) generally denotes that one of the comparison signals Vptat(1)-Vptat(n) represents the comparison temperature T(i). The fact that a comparison signal Vptat(i) represents a comparison temperature T(i) is tantamount to the fact that if the temperature T corresponds to the comparison temperature T(i), the comparison signal Vptat(i) is at least approximately equal to the first temperature-dependent signal Vctat. In this way, the temperature can be deduced by comparing the first temperature-dependent signal Vctat with the comparison signals Vptat(1)-Vptat(n). In this regard, the temperature T lies within an interval given by the temperatures T(i) and T(i−1), for example, if the comparison of the first temperature-dependent signal Vctat with the comparison signal Vptat(i) reveals that the temperature T is above T(i) and the comparison of the first temperature-dependent signal Vctat with the comparison signal Vptat(i−1) reveals that the temperature T is below T(i−1).

In the example illustrated, the first temperature-dependent signal Vctat and the comparison signals Vptat(1)-Vptat(n) have opposite signs, wherein the first temperature-dependent signal Vctat has a negative temperature coefficient, such that a signal level of the first temperature-dependent signal Vctat decreases as the temperature T rises, and wherein the comparison signals Vptat(1)-Vptat(n) have a positive temperature coefficient, such that signal levels of the comparison signals Vptat(1)-Vptat(n) each increase as the temperature T rises. In this example, the temperature lies within a temperature range defined by two comparison temperatures T(i) and T(i−1) when the first temperature-dependent signal Vctat is below the comparison signal Vptat(i) representing the temperature T(i) and is above the comparison signal Vptat(i−1) representing the temperature T(i−1), where T(i−1) is greater than T(i), T(i−1)>T(i), in the example illustrated.

As explained above, the comparison signals Vptat(1)-Vptat(n) are generated on the basis of the second temperature-dependent signal. Said second temperature-dependent signal can be used as one of the comparison signals, such that the remaining comparison signals are derived from this one comparison signal. In accordance with a further example, all of the comparison signals Vptat(1)-Vptat(n) differ from the second temperature-dependent signal, such that all of the comparison signals Vptat(1)-Vptat(n) are derived from the second temperature-dependent signal.

In accordance with one example, the first temperature-dependent signal Vctat is generated such that the following holds true for the first temperature-dependent signal Vctat:

$$Vctat = Vctat_O + kctat \cdot T \quad (2),$$

where $Vctat_O$ denotes an offset and kctat denotes the temperature coefficient of the first temperature-dependent signal Vctat. This temperature coefficient kctat is negative, for example, such that the first temperature-dependent signal Vctat becomes smaller as the temperature rises. In this example, the comparison signals Vptat(1)-Vptat(n) are generated for example such that for each of these comparison signals it holds true that $$Vptat(i) = Iptat \cdot p(i) \quad (3),$$

where Iptat denotes the second temperature-dependent signal and p(i) denotes a respective proportionality factor. In accordance with one example, the second temperature-dependent signal Iptat is generated such that the following holds true for the second temperature-dependent signal Iptat:

$$Iptat = Iptat_O + kptat \cdot T \quad (4),$$

where $Iptat_O$ denotes an offset and kptat denotes the temperature coefficient of the second temperature-dependent signal Vctat. This temperature coefficient kptat is positive, for example, such that the second temperature-dependent signal Iptat becomes larger as the temperature rises. Taking account of equations (3) and (4), the following holds true for the comparison signals in this example:

$$Vptat(i) = (Iptat_O + kptat \cdot T) \cdot p(i) = Iptat_O \cdot p(i) + kptat \cdot T \cdot p(i) \quad (5),$$

where the proportionality factors p(i) are each positive, such that the comparison signals Vptat(1)-Vptat(n) each increase according to the second temperature-dependent signal Iptat as the temperature T rises.

Moreover, the comparison signals have different offsets and different gradients, wherein the offset of each comparison signal Vptat(i) is given by $Iptat_O \cdot p(i)$, that is to say by the offset of the second temperature-dependent signal Iptat multiplied by the respective proportionality factor and, wherein the temperature coefficient of each comparison signal Vptat(i) is given by kptat p(i), that is to say by the temperature coefficient of the second temperature-dependent signal Iptat multiplied by the respective proportionality factor. The comparison signals Vptat(1)-Vptat(n) do not intersect in this example. Moreover, it holds true that the temperature T(i) represented by a comparison signal is all the higher, the lower the respective proportionality factor p(i).

As explained above, the first temperature-dependent signal Vctat and the comparison signal Vptat(i) representing a temperature T(i) are coordinated with one another in such a way that the temperature-dependent signal Vctat and the comparison signal Vptat(i) intersect at the temperature T(i). By way of example, if the first temperature-dependent signal Vctat is generated in accordance with Equation (2) and the comparison signal Vptat(i) is generated in accordance with Equation (5), then this is tantamount to $$Vctat_O + kctat \cdot T(i) = (Iptat_O + kptat \cdot T(i)) \cdot p(i) \quad (6a),$$

such that the proportionality factor p(i) is set as follows in this case:

$$p(i) = \frac{Vctat_O + kctat \cdot T(i)}{(Iptat_O + kptat \cdot T(i))}. \quad (6b)$$

Various possibilities for setting the proportionality factor p(i) will also be explained in detail below.

Even though the first temperature-dependent signal Vctat has a positive temperature coefficient and the comparison signals Vptat(1)-Vptat(n) each have a positive temperature coefficient in the example in accordance with FIG. 2, this is merely one example. The method functions in a corresponding manner if the first temperature-dependent signal Vctat has a negative temperature coefficient and the comparison signals Vptat(1)-Vptat(n) each have a positive temperature coefficient.

The method explained affords various advantages. (a) In the case of the method explained, it is not necessary to provide a temperature-independent reference value, the provision of which may be complex by virtue of required trimming or calibration. Instead, two signals dependent on the temperature to be determined are provided, which have different temperature coefficients and the provision of which does not necessitate trimming or calibration. (b) As will also be explained below, the two temperature-dependent signals can be generated by the same temperature sensor. As a result, process fluctuations during the production of the temperature sensor can affect the generation of the two temperature-dependent signals by the temperature sensor in the same way, such that the effects of the process fluctuations on the temperature determination can ultimately cancel one another out and said process fluctuations have no influence on the temperature determination. (c) By using two temperature-dependent signals having different temperature coefficients, the method is robust vis-à-vis inaccuracies of the temperature coefficient of one of the two temperature-dependent signals. If the first and second temperature-dependent signals are chosen for example such that they have temperature coefficients having different signs, then for the temperature detection this results in an effective temperature coefficient whose magnitude corresponds to the sum of the magnitudes of the temperature coefficients of the two temperature-dependent signals, such that fluctuations of one of the temperature coefficients have overall a lesser effect than in the case of a conventional method in which a temperature-dependent signal is compared with a fixed reference value.

Figure 3:
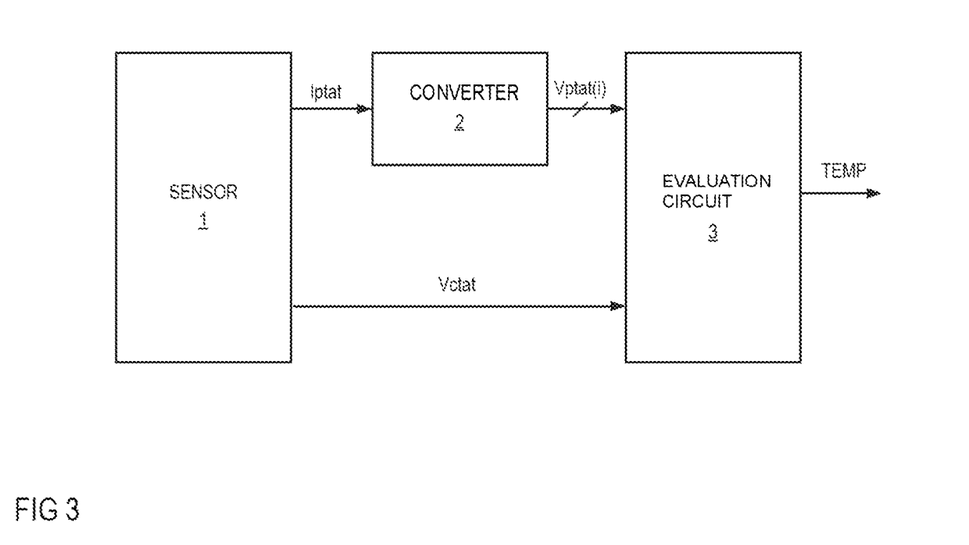
FIG. 3 shows a block diagram of a temperature measuring circuit in accordance with one example, comprising a temperature sensor, a converter and an evaluation circuit.

FIG. 3 shows a block diagram of a temperature measuring circuit configured to determine the temperature in line with the method in accordance with FIG. 1. This temperature measuring circuit comprises a temperature sensor 1 configured to generate the first temperature-dependent signal Vctat and the second temperature-dependent signal Iptat; a converter 2 configured to generate the comparison signals (where Vptat(i) in FIG. 3 represents an arbitrary one of the comparison signals Vptat(1)-Vptat(n) or the set of all comparison signals Vptat(1)-Vptat(n)); and an evaluation circuit 3 configured to output temperature information TEMP on the basis of a comparison of the first temperature-dependent signal Vctat with at least one of the comparison signals Vptat(1)-Vptat(n).

As explained above, a corresponding temperature T(i) is assigned to each comparison signal Vptat(i), with a temperature interval being formed between each two adjacent temperatures. If n comparison signals are generated, for example, to which n different temperatures are assigned, then there are n−1 temperature intervals. In accordance with one example, the temperature information TEMP is generated by the evaluation circuit 3 in such a way that the temperature information TEMP contains information about which of the n−1 temperature intervals the temperature is in. This procedure is suitable particularly when the temperature measurement range covers all temperatures that can occur at the temperature measuring circuit during the proper operation.

In a further example, the temperature measuring circuit is configured also to output a value indicating that the detected temperature lies outside the temperature measurement range. This procedure is suitable particularly when that range does not cover all temperatures that can occur at the temperature measuring circuit during correct operation. In accordance with one example, instead of only value indicating that the temperature lies outside the measurement range, two values can be output: a first value suitable for indicating that the temperature lies below the temperature measurement range; and a second value suitable for indicating that the temperature lies above the temperature measurement range.

The evaluation circuit 3 can compare the first temperature-dependent signal Vctat with the comparison signals Vptat(1)-Vptat(n) simultaneously or temporally successively. In the latter case, the converter 2 can generate the comparison signals Vptat(1)-Vptat(n) temporally successively. In this case, the comparison process, that is to say comparing the first temperature-dependent signal Vctat with the comparison signals Vptat(1)-Vptat(n), can be ended as soon as the temperature information TEMP is present. If it is thus determined for example that the temperature lies within a specific temperature interval, no further comparisons are required until the next temperature determination. A frequency at which the temperature is determined, that is to say at which the temperature information TEMP is output, is dependent on the intended application, for example. A frequency at which the temperature information is output lies between a few 10 kHz and a few MHz, for example.

Figure 4:
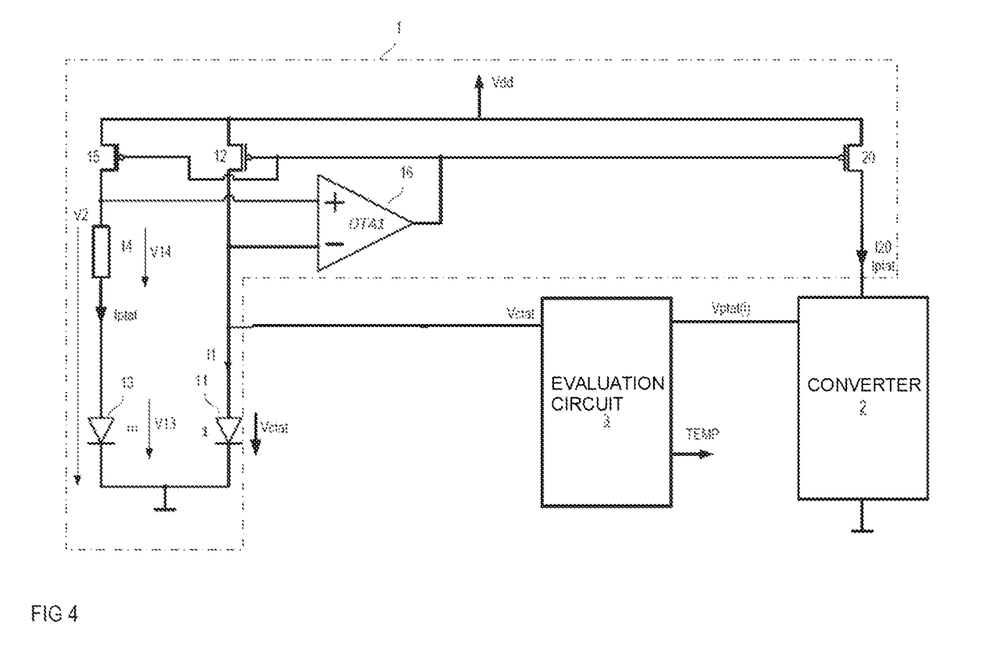
FIG. 4 shows a temperature measuring circuit of the type shown in FIG. 3, wherein one example of the temperature sensor is presented in detail.

FIG. 4 shows in detail one example of the temperature sensor 1, which generates the first temperature-dependent signal Vctat and the first temperature-dependent signal Iptat. In this example of the temperature sensor 1, the first temperature-dependent signal Vctat is a voltage across a first diode 11 and the second temperature-dependent signal Iptat is a current through a series circuit having a second diode 13 and a resistor 14. The temperature sensor 1 additionally comprises a current regulator configured to regulate a current I1 through the first diode 11 and the current Iptat through the series circuit having the second diode 13 and the resistor 14 in such a way that the voltage Vctat across the first diode 11 is at least approximately equal to a voltage V2 across the series circuit having the second diode 13 and the resistor 14.

In the example illustrated, the current regulator comprises a first transistor 12 connected in series with the first diode 11, a second transistor 15 connected in series with the series circuit having the second diode 13 and the resistor 14, and an operational amplifier 16, which drives the two transistors 12, 15 depending on the voltage Vctat across the first diode 11 and the voltage V2 across the series circuit having the second diode 13 and the resistor 14 in such a way that these two voltages Vctat, V2 are equal, Vctat=V2. For this purpose, the voltage Vctat across the first diode 11 is fed to the operational amplifier 16 at a first input, and the voltage across the series circuit 13, 14 is fed to the operational amplifier at a second input. In the example illustrated, the first input of the operational amplifier 16 is an inverting input and the second input of the operational amplifier 16 is a noninverting input. However, this is just one example.

In the example illustrated, the transistors 12, 15 are driven by the operational amplifier 16 in such a way that their drive voltages are identical in each case. Moreover, in the example, the transistors 12, 15 are chosen in such a way that they have the same size (active area). As a result, if the drive voltages are identical, the two transistors 12, 15 are operated at the same operating point by the operational amplifier 16, such that the current I1 through the first diode 11 is equal to the current Iptat through the series circuit 13, 14. The first diode 11 has a smaller active area than the second diode 13, wherein an area ratio between the active area of the first diode 11 and the active area of the second diode 13 is 1:m, for example. The second diode 13 can comprise for example m parallel-connected diodes of the same type (of the same size) as the first diode 11 in order to attain the desired area ratio.

On account of the larger active area of the second diode 13 in comparison with the active area of the first diode 11, the current Iptat brings about a voltage V13 across the second diode 13 which is lower than the voltage Vctat brought about across the first diode 11 by the current I1 of equal size. A voltage V14 across the resistor 14 corresponds to the difference between the voltage V2 across the series circuit 13, 14 (or the voltage Vctat across the first diode 11) and the voltage across the second diode 13, wherein the operational amplifier 16 drives the two transistors 12, 15 precisely in such a way that the currents I1, Iptat bring the voltages Vctat, V2 across the first diode 11 and across the series circuit 13, 14 to equilibrium.

In the case of the temperature sensor 1 explained with reference to FIG. 4, the two transistors 12, 15 are of the same size, such that the currents I1 and Iptat in the two circuit branches have the same magnitude, and the second diode 13 has a larger active area than the first diode 11, such that the voltage V13 across the second diode 13 is less than the voltage Vctat across the first diode 11. However, this is just one example. As an alternative or in addition to diodes 11, 13 having different active areas, the first and second transistors 12, 15 can also be realized in such a way that they have different active areas, wherein the area ratios of the transistors 12, 15 should be adapted to the area ratios of the diodes such that the voltage V13 brought about across the second diode 13 by the current Iptat is less than the voltage brought about at the first diode by the current I1.

This can be achieved for example by the active areas of the two diodes 11, 13 being of the same size and by the second transistor 15 having a smaller area than the first transistor 12, such that the current Iptat through the series circuit 13, 14 is less than the current I1 through the first diode 11. In accordance with one example, the active area of the first transistor 12 is m times the active area of the second transistor 15, such that the current Iptat through the first diode is only 1/m of the current I11 through the first diode 11.

However, this can also be achieved by the active area of the second diode 13 being larger than the active area of the first diode 11 and the active area of the second transistor 15 being smaller than the active area of the first transistor 12, provided that the area ratios are chosen such that a ratio m1 between the active area of the second diode 13 and the first diode 11 is greater than a ratio m2 between the active area of the first transistor 12 and the active area of the second transistor 12.

The fact that the voltage V13 brought about across the second diode 13 by the current Iptat is less than the voltage brought about at the first diode by the current I1, given a suitable choice of the area ratios of the transistors 12, 15, can even also be achieved if the first diode 11 has a larger active area than the second diode 13.

The two transistors 12, 15 can be transistors of an arbitrary type. Without being restricted thereto, the two transistors in the example illustrated are p-MOSFETs (Metal Oxide Semiconductor Field-Effect Transistors), having a load path (Drain-Source path) between a drain terminal and a source terminal, and having a gate terminal. In this example, the drive voltage set by the operational amplifier 16 is in each case a voltage between the gate terminal and the source terminal. The drain-source path of the first transistor 12 together with the first diode 11 forms a first series circuit and the drain-source path of the second transistor 15 together with the second diode 13 and the resistor 14 forms a second series circuit. The two series circuits are each connected between supply terminals in such a way that a supply voltage Vdd is present across each of the two series circuits.

In the case of the temperature sensor 1 illustrated in FIG. 4, the voltage Vctat across the first diode 11, which represents the first temperature-dependent signal, is given by $$Vctat = Vctat_O - \frac{k \cdot T}{q} \cdot \ln\left(\frac{I_0}{I1}\right), \quad (7)$$

where $Vctat_0$ represents the offset mentioned above, k represents the Boltzmann constant, q represents the elementary charge, $I_0$ represents the saturation current or the saturation reverse current of the first diode 11, I1 represents the current through the first diode 11 and T represents the temperature. The in accordance with Equation 2 is given in this case by $$kctat = -\frac{k}{q} \cdot \ln\left(\frac{I_0}{I1}\right). \quad (8)$$

The saturation reverse current I0 and the current I1 through the first diode 11 are each temperature-dependent, but the quotient I0/I1 of the two currents has a negligible temperature dependence, and so the temperature coefficient kctat can be regarded as at least approximately constant, and thus temperature-independent.

In the case of the temperature sensor 1 in accordance with FIG. 4 the second temperature-dependent signal Iptat is given by $$Iptat = \frac{k \cdot T}{q} \cdot \frac{\ln\left(\frac{m}{1}\right)}{R14}, \quad (9)$$

where k represents the Boltzmann constant, q represents the elementary charge, T represents the temperature, R14 represents the resistance value of the resistor 14, and m/1 represents the ratio between the active area of the second diode 13 and the active area of the first diode 11.

In the case of the second temperature-dependent signal Iptat in accordance with Equation (9), the offset $Iptat_O$ in accordance with Equation (4) is zero, $Iptat_O=0$. In the case of the second temperature-dependent signal Iptat in accordance with Equation (9), the proportionality factor kptat in accordance with Equation (4) is given by $$kptat = \frac{k}{q} \cdot \frac{\ln\left(\frac{m}{1}\right)}{R14}. \quad (10)$$

Referring to FIG. 4, the temperature sensor 1 can additionally comprise an output transistor 20, which together with the two transistors 12, 15 of the current regulator forms a current mirror and which outputs a current I20 representing the second temperature-dependent signal Iptat. In accordance with one example, the output transistor 20 has the same active area as the first transistor 12 of the current regulator, such that a current mirror ratio of the current mirror is 1:1 and the current level of the current I20 output by the output transistor 20 is equal to the temperature-dependent current level of the current Iptat forming the second temperature-dependent signal. For further explanation, it is assumed that the output current I20 of the temperature sensor 1 is equal to the current Iptat forming the second temperature-dependent signal. However, this is just one example. In accordance with a further example, the current mirror ratio differs from 1:1. In this case, the output current I20 is proportional to the current Iptat forming the second temperature-dependent signal, wherein this proportionality factor should accordingly be taken into account when generating the comparison signals Vptat(i)-Vptat(n).

Figure 5:
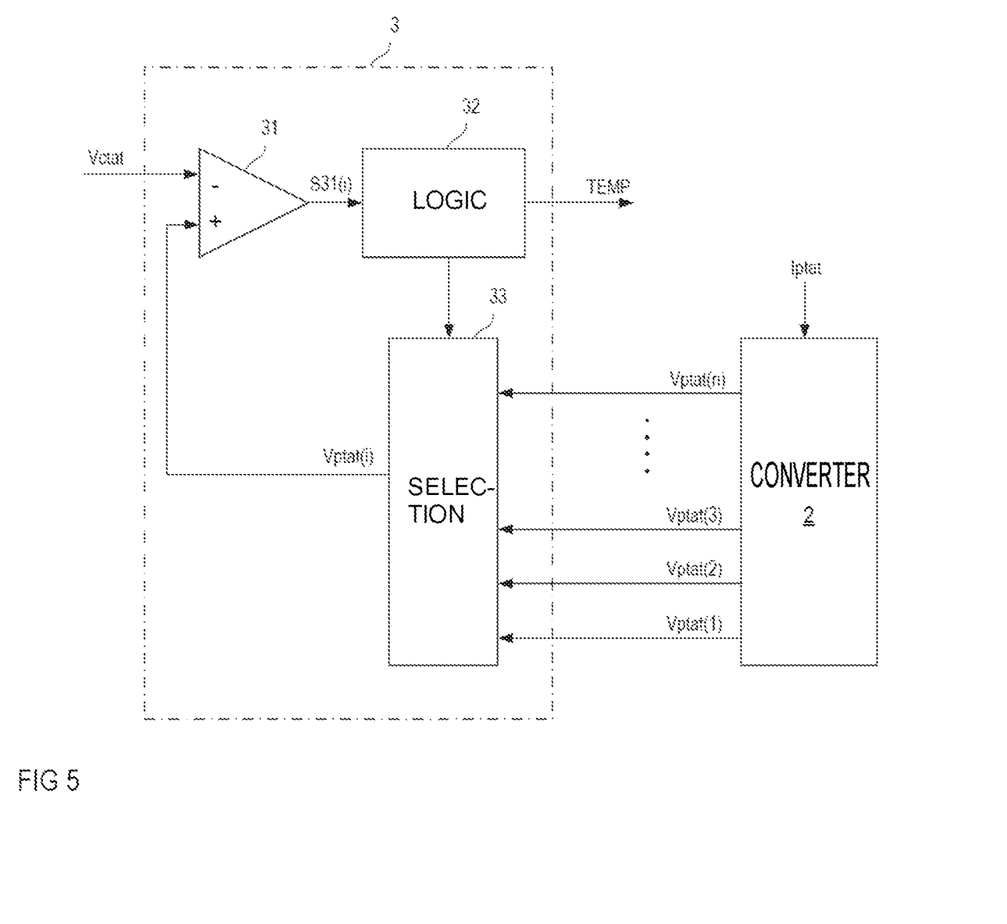
FIG. 5 shows one example of the evaluation circuit.

FIG. 5 shows a block diagram of one example of the evaluation circuit 3. This evaluation circuit 3 is configured to compare the first temperature-dependent signal Vctat with the individual comparison signals Vptat(1)-Vptat(n) provided by the converter 2. The converter 2 can be configured—as illustrated—to generate the comparison signals Vptat(1)-Vptat(n) simultaneously or can be configured to generate a plurality of the comparison signals Vptat(1)-Vptat(n) temporally successively.

The evaluation circuit 3 comprises a selection circuit 33 controlled by a logic 32. If the converter 2 is realized in such a way that it generates a plurality of comparison signals Vptat(1)-Vptat(n) simultaneously, the selection circuit 33 is configured for example to select one of the plurality of simultaneously available comparison signals Vptat(1)-Vptat(n). If the converter 2 is realized in such a way that it provides a plurality of comparison signals Vptat(1)-Vptat(n) temporally successively, the selection circuit 33 is configured for example to select one of the comparison signals Vptat(1)-Vptat(n) by means of said selection circuit causing the converter 2 to generate this comparison signal.

The evaluation circuit 3 illustrated in FIG. 5 is configured to compare the first temperature-dependent signal Vctat temporally successively with the comparison signals Vptat(1)-Vptat(n) provided by the converter 2. However, this evaluation circuit 3 can be modified in a simple manner to the effect that it simultaneously compares two or more of the comparison signals Vptat(1)-Vptat(n) with the first temperature-dependent signal Vctat, wherein a corresponding selection circuit and a corresponding comparative should be provided for each comparison that is intended to be effected simultaneously.

FIG. 5, Vptat(i) denotes the comparison signal selected by the selection circuit 33. The comparison signal Vptat(i) selected by the selection circuit 33 and the first temperature-dependent signal Vctat are fed to a comparator 31, which compares the first temperature-dependent signal Vctat with the selected comparison signal Vptat(i) and outputs a comparator signal S31($i$) dependent on the comparison to the logic circuit 32.

The logic circuit 32 is configured to output the temperature information TEMP depending on the comparator signals S31($i$) that the logic circuit 32 obtains from the comparator 31. If for example the comparator signal S32($i$) obtained with respect to a comparison signal Vptat(i) indicates that the temperature T is above the temperature T(i) represented by the comparison signal Vptat(i)—by virtue of the first temperature-dependent signal Vctat being below the comparison signal Vptat(i) for example—and if for example the comparator signal S32($i$−1) obtained with respect to a comparison signal Vptat(i−1) indicates that the temperature T is below the temperature T(i−1) represented by the comparison signal Vptat(i−1)—by virtue of the first temperature-dependent signal Vctat being above the comparison signal Vptat (i−1) for example—, then the logic 32 outputs as temperature information TEMP for example the fact that the temperature lies within the interval defined by the two temperatures T(i), T(i−1).

The temperature information TEMP can be output in any desired manner. In accordance with one example, the logic 32 outputs a digital word that can assume n−1 different values, where each of these values represents one of the n−1 temperature intervals formed by the temperatures T(1)-T(n).

Optionally, the digital word output by the logic 32 can assume one additional value indicating that the temperature lies outside the temperature measurement range, or can assume two additional values indicating that the temperature lies below and respectively above the temperature measurement range.

The converter 2 configured to generate the comparison signals Vptat(1)-Vptat(n) depending on the second temperature-dependent signal Iptat can be realized in various ways. Some examples are explained below.

Figure 6:
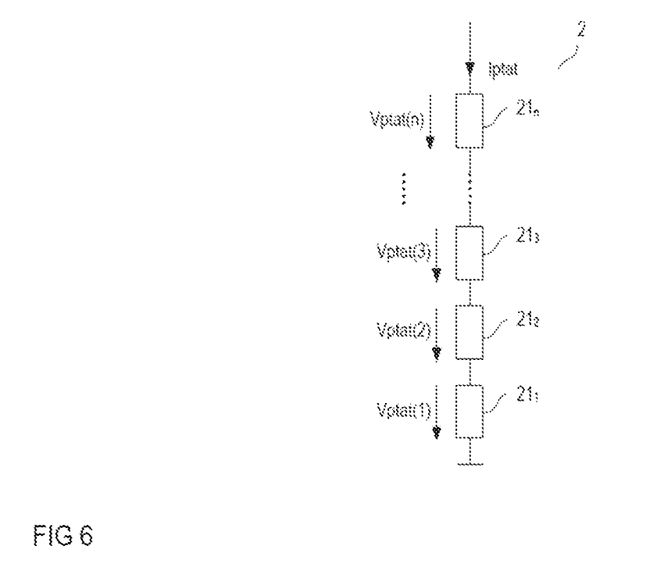
FIGS. 6-10 show various examples of the converter.

FIG. 6 shows a first example of a converter 2. This converter comprises a series circuit having n resistors $21_1$-$21_n$, which are connected to the output of the temperature sensor 1 (not illustrated in FIG. 6) in such a way that the current Iptat representing the second temperature-dependent signal flows through the series circuit formed by the n resistors $21_1$-$21_n$. In this example, resistance values R(1)-R(n) are chosen such that the voltage across each of the resistors $21_1$-$21_n$ forms in each case one of the comparison signals Vptat(1)-Vptat(n). In principle, in this example it thus holds true that $$Vptat(i)=Iptat \cdot R(i) \qquad (11),$$

where Vptat(i) denotes the voltage across an arbitrary resistor $21_i$ from among the resistors $21_1$-$21_n$ and R(i) denotes the resistance value of the respective resistor 21. In this example, the resistance values R(i) form the proportionality factors p(i) explained with reference to Equation (3) and are chosen according to the explanations concerning Equation (3) such that each of the comparison signals Vptat(i) represents a corresponding temperature.

In accordance with one example, the resistance values R(i) are chosen such that the temperatures T(i) represented by the individual comparison values Vptat(i) form a group of temperatures that are equidistant, such that all the temperature intervals have the same width.

The converter 2 in accordance with FIG. 6 makes all the comparison signals Vptat(1)-Vptat(n) available simultaneously, wherein the evaluation circuit 3 (not illustrated in FIG. 6) can compare the comparison signals Vptat(1)-Vptat (n) with the first temperature-dependent signal Vctat simultaneously or temporally successively. In accordance with one example, the converter 3 comprises a selection circuit 33 in accordance with FIG. 5, wherein the selection circuit 33 is configured to select temporally successively the comparison signals Vptat(1)-Vptat(n) formed by the voltages across the resistors $21_1$-$21_n$. In this example, selecting one Vptat(i) of the comparison signals Vptat(1)-Vptat(n) comprises measuring the voltage across the respective resistor $21_1$.

Figure 7:
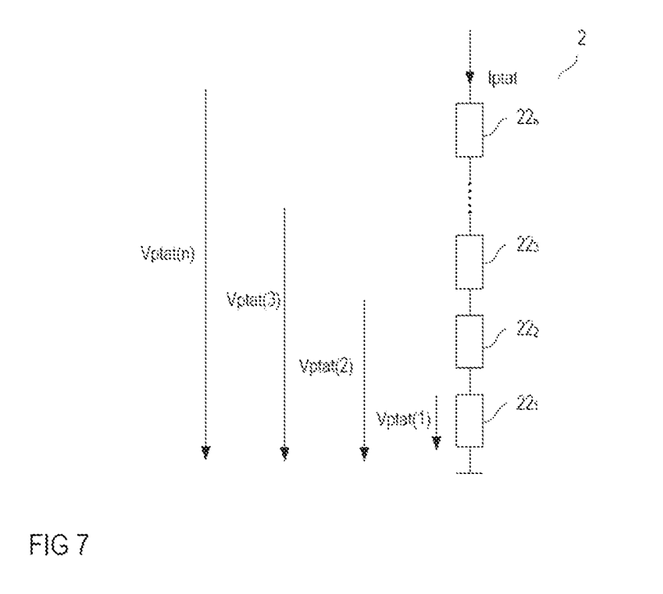

FIG. 7 shows a further example of a converter 2. This converter likewise comprises a series circuit having n resistors $22_1$-$22_n$, which are connected to the output of the temperature sensor 1 (not illustrated in FIG. 6) in such a way that the current Iptat representing the second temperature-dependent signal flows through the series circuit having the resistors $22_1$-$22_n$. Resistance values of these resistors $22_1$-$22_n$ are chosen such that at least some of the comparison signals Vptat(1)-Vptat(n) are formed by the sum of the voltages across two or more of the resistors $22_1$-$22_n$. In this regard, a first comparison signal Vptat(1) corresponds for example to the voltage across a first resistor $22_1$, the resistance value R(1) of which is chosen such that the first comparison signal Vptat(1) a first temperature T(1).

A second comparison signal Vptat(2) corresponds for example to the voltage across a series circuit formed by the first resistor $22_1$ and a second resistor 22 connected thereto, a third comparison signal Vptat(3) corresponds for example to the voltage across a series circuit formed by the first resistor $22_1$, the second resistor 222 and a third resistor 223 connected to the second resistor 222, and so on. In this example, a resistance value ΔR(2) of the second resistor 222 is chosen such that a sum of the resistance value R(1) of the first resistor $22_1$ and the resistance value ΔR(2) of the second resistor 222 corresponds identically to a resistance value R(2) by which the second temperature-dependent signal Iptat is to be multiplied, such that the second comparison signal Vptat(2) represents a second temperature, i.e.

$$\Delta R(2)=R(2)-R(1) \quad (12a).$$

Generally, in this example, a resistance value ΔR(i) of an arbitrary resistor $22_i$, where 2≤i≤n, can be chosen such that $$\Delta R(i)=R(i)-R(i-1) \quad (12b),$$

where a comparison signal Vptat(i) in this case corresponds to a sum of the voltages across the resistors $22_1$-$22_i$.

In the example illustrated in FIG. 6, each of the comparison signals Vptat(1)-Vptat(n) corresponds to the voltage across one of the resistors in each case and, in the example illustrated in FIG. 7, apart from the first comparison signal Vptat(1), the comparison signals Vptat(1)-Vptat(n) correspond to the voltage across two or more resistors connected in series in each case. It goes without saying that the concepts in accordance with FIGS. 6 and 7 can also be combined with one another, such that in one converter two or more of the comparison signals Vptat(1)-Vptat(n) correspond to the voltage across one resistor in each case and two or more other comparison signals from among the comparison signals Vptat(1)-Vptat(n) correspond to the voltage across at least two resistors.

In the case of the converters 2 illustrated in FIGS. 6 and 7, the series-connected resistors are always activated, that is to say that the current Iptat representing the second temperature-dependent signal permanently flows through said resistors. The evaluation circuit 3 (not illustrated in either case) is configured here to tap off voltages at different locations of the respective series circuit in order to obtain different comparison signals.

Figure 8:
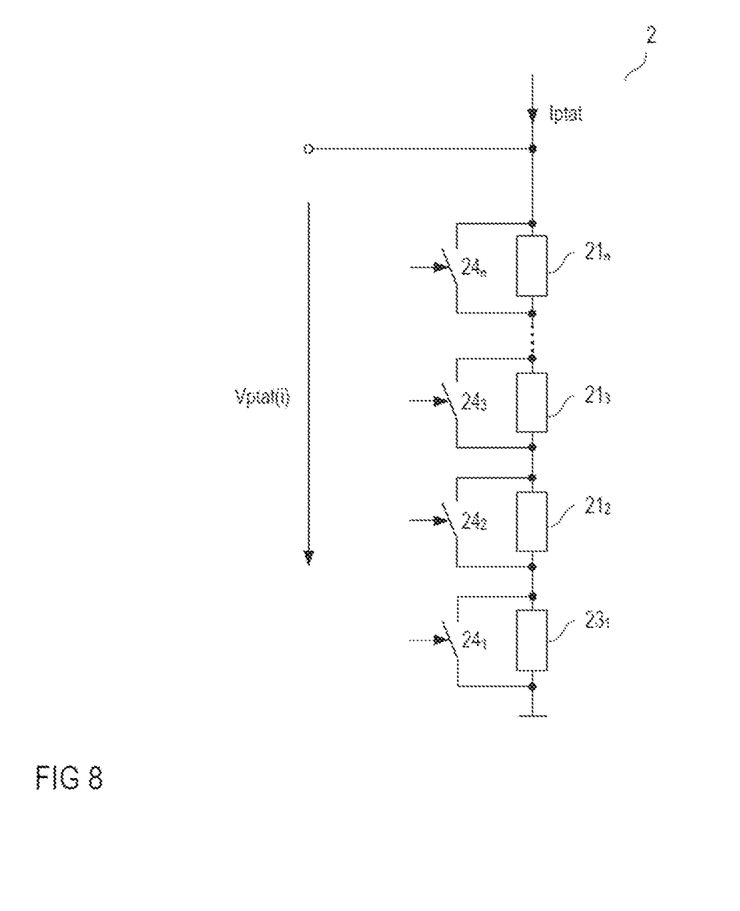

FIG. 8 shows a further example of a converter 2 comprising a plurality of series-connected resistors $23_1$-$23_n$ and only one tap for tapping off a comparison signal Vptat(i) for the evaluation circuit 3 (not illustrated). In the case of this converter, at least some of the resistors are deactivatable, wherein deactivating one of the resistors $23_1$-$23_n$ is effected by closing a switch $24_1$-$24_n$ connected in parallel with the respective resistor $23_1$-$23_n$, with the result that the respective resistor is bridged. Merely for illustration purposes, in the example illustrated in FIG. 8, each of the resistors is bridgeable by a corresponding switch $24_1$-$24_n$. However, this is just one example. In other examples (not illustrated) there is also a possibility of no switch being connected in parallel with one or more of the resistors, such that the respective resistor is not bridgeable.

In the case of the converter in accordance with FIG. 8, the switches $24_1$-$24_n$ are driven by the evaluation circuit 3 (not illustrated in FIG. 8), in particular the selection circuit 33 of the evaluation circuit 3, wherein the selection circuit 33 under the control of the logic 32 drives switches $24_1$-$24_n$ in such a way that a sum of the resistance values of the active (non-bridged) resistors corresponds to the resistance value that is assigned to the desired comparison signal Vptat(i). The resistors $23_1$-$23_n$ can be realized for example according to the example explained with reference to FIG. 6, in which the voltage across exactly one resistor represents a comparison signal. The resistors $23_1$-$23_n$ are activated only one at a time in this case. The resistors $23_1$-$23n$ can also be realized according to the example explained with reference to FIG. 7, in which the voltage across a plurality of resistors can represent a comparison signal. A plurality of the resistors $23_1$-$23_n$ are activated simultaneously in this case.

In the examples illustrated with reference to FIGS. 7 and 8, the number of series-connected resistors can correspond to the number of comparison signals Vptat(1)-Vptat(n) in order to be able to set n different resistance values R(1)-R(n). However, this is just one example. In principle, it is also possible for more or fewer than n resistors to be connected in series. All that is crucial is that the resistance values R(1)-R(n) required for providing the n different comparison signals Vptat(1)-Vptat(n) can be established by a combination of the resistance values of the resistors present.

The converters explained with reference to FIGS. 6 to 8 are resistive converters since resistors are used for providing the comparison signals Vptat(1)-Vptat(n) on the basis of the second temperature-dependent signal Iptat, i.e. for converting the second temperature-dependent signal Iptat into the comparison signals Vptat(1)-Vptat(n). However, the use of a resistive converter is just one example. In principle, it is possible to use any types of converters that are suitable for generating, on the basis of the second temperature-dependent signal, such as the current Iptat represented in the second temperature-dependent signal, for example, a plurality of comparison signals that are proportional to the second temperature-dependent signal.

Figure 9:
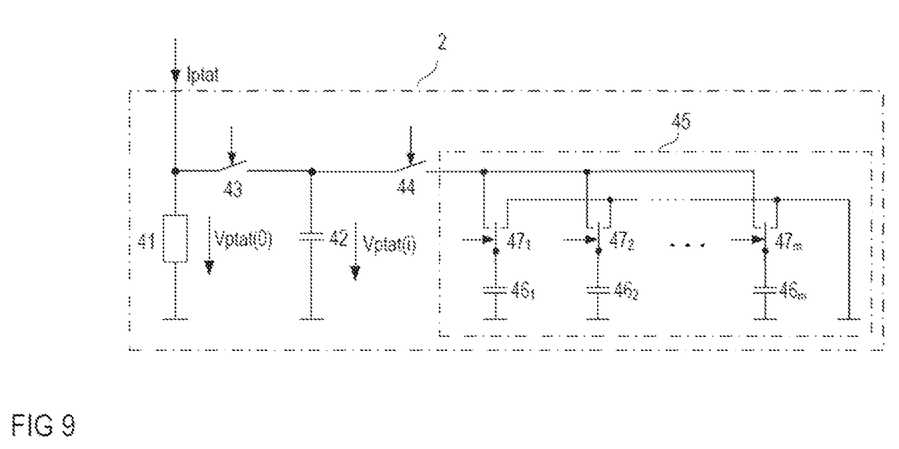

A further example of a converter 2 suitable for this purpose is illustrated in FIG. 9. This converter 2 is a capacitive converter, in particular a capacitive converter having switched capacitors (capacitances). This converter comprises a resistor 41 connected to the current sensor 2 (not illustrated in FIG. 9) in such a way that the current Iptat representing the second temperature-dependent signal flows through the resistor 41. In this case, a voltage Vptat(0) across the resistor 41 is proportional to the second temperature-dependent signal, wherein a proportionality factor between the voltage Vptat(0) and the second temperature-dependent signal Iptat is given by a resistance value R41 of the resistor, such that the following holds true:

$$Vptat(0)=Iptat \cdot R41 \quad (13).$$

A first capacitor 42 is connected in parallel with the resistor 41 via a first switch 43 and is connected to a capacitor arrangement 45 via a further switch 44. The capacitor arrangement 45 comprises a plurality of further capacitors $46_1$-$46_m$, wherein each of these further capacitors $46_1$-$46_m$, via a respective changeover switch $47_1$-$47_m$, can either be discharged or—with the second switch 44 closed—be connected in parallel with the first capacitor 42.

In the case of this converter 2, a comparison signal Vptat(i) fed to the evaluation circuit 3 corresponds for example to the voltage across the second capacitor 42, wherein this voltage can change during the measuring process in order that different comparison signals are made available temporally successively. The first and second switches 43, 44 and the changeover switches $47_1$-$47_m$ are driven for example by the selection circuit 33 in the evaluation circuit 3.

Hereinafter, C42 denotes a capacitance of the first capacitor 42 and C45 denotes a capacitance of the capacitor arrangement 45. The capacitance C45 of the capacitor arrangement 45 is variable and dependent on which of the further capacitors $46_1$-$46_m$ are connected in parallel with one another and—with the second switch 44 closed—in parallel with the first capacitor 42.

The comparison signal Vptat(i) is generated by the converter 2 illustrated in FIG. 9 in the manner explained below. Firstly, the first switch 43 is closed in order to charge the first capacitor 42 in such a way that the voltage across the first capacitor 42 corresponds to the voltage Vptat(0) across the resistor 41. With the first switch 43 closed, the second switch 44 is open. Subsequently, the first switch 43 is opened and the second switch 44 is closed, in which case, with the second switch 44 closed, the first capacitor 42 is partly discharged. The voltage Vptat(i) that is established after the closing of the second switch 44 is dependent on the voltage Vptat(0) before the opening of the switch and the capacitances C42, C45 as follows:

$$Vptat(i) = \frac{C42}{C42 + C45} \cdot Vptat(0) = \frac{C42}{C42 + C45} \cdot R41 \cdot Iptat, \quad (14)$$

where a proportionality factor p(i) in the sense of Equation (3) is given here by $$p(i) = \frac{C42}{C42 + C45} \cdot R41 \quad (15)$$

and can be adjusted with a given capacitance C42 of the first capacitor and a given resistance value R41 of the resistor 41 by way the variable capacitance C45 of the capacitor arrangement 45.

The switches $46_1$-$46_m$ of the capacitor arrangement 45 are driven in such a way that the capacitors $46_1$-$46_m$ are discharged before the closing of the second switch 44, i.e. before the partial discharging of the first capacitor 42.

In accordance with one example, the converter 2 will be operated in such a way that after each process of charging the first capacitor 42 and connecting the first capacitor 42 in parallel with the capacitor arrangement 45, only one comparison signal is generated and, before a further comparison signal is generated, the first capacitor 42 is charged once again on the basis of the voltage Vptat(0) across the resistor 41.

In accordance with a further example, the converter 2 is operated in such a way that after each process of charging the first capacitor 42 and connecting the first capacitor 42 in parallel with the capacitor arrangement 45, a plurality of comparison signals are generated by the capacitance C45 of the capacitor arrangement 45 being varied, while the capacitor arrangement 45 is connected in parallel with the first capacitor 42. Varying the capacitance C45 comprises connecting in parallel with the first capacitor 42 one or more of the capacitors $46_1$-$46_m$ which up until then were discharged and not connected in parallel with the first capacitor 42.

Figure 10:
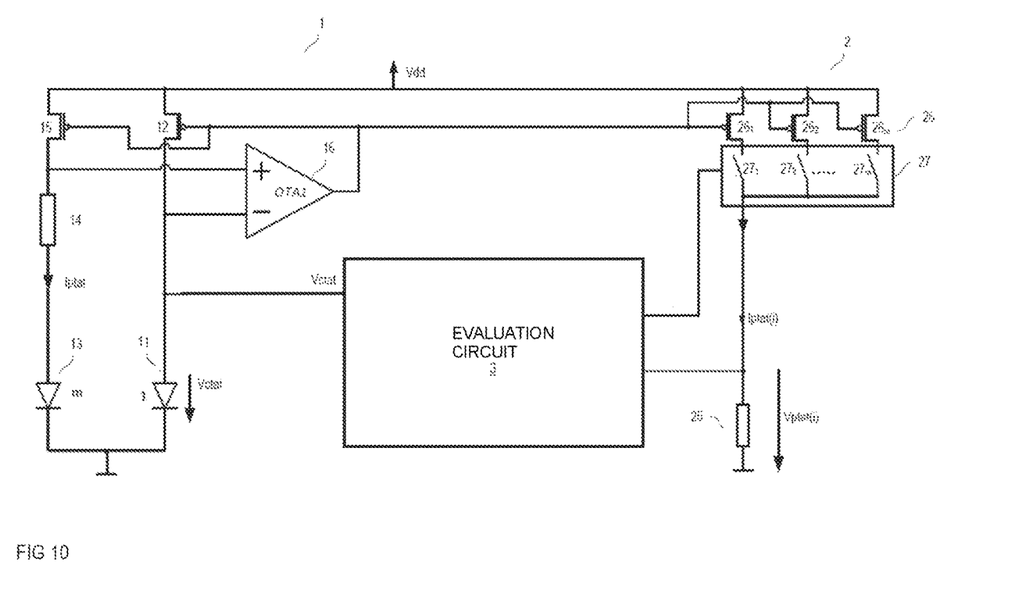

FIG. 10 shows a temperature measuring arrangement in accordance with a further example. In this example, the converter 2 comprises a current mirror arrangement 26 having a plurality of current mirror transistors $26_1$-$26_m$, wherein each of these current mirror transistors $26_1$-$26_m$ is connected to the first and second transistors 12, 15 of the current sensor 1 and supplies a current that is proportional to the current Iptat representing the second temperature-dependent signal. A proportionality factor between the current Iptat and the current provided by the respective current mirror transistor $26_1$-$26_m$ is dependent on a ratio between the active area of the respective current mirror transistor $26_1$-$26_m$ and the active area of the first or second transistor 12, 15.

The individual current mirror transistors $26_1$-$26_m$ are activatable and deactivatable, wherein they supply a current proportional to Iptat in the activated state and they supply no current in the deactivated state. The activating or deactivating is effected for example by means of a switch arrangement 27 comprising a plurality of switches $27_1$-$27_m$, each of which is connected in series with one of the current mirror transistors $26_1$-$26_m$. The switch arrangement 27 is controlled by the evaluation circuit 3, for example, in order to activate or deactivate individual current mirror transistors from among the current mirror transistors $26_1$-$26_m$. In this example, a current mirror transistor is activated if the series-connected switch of the switch arrangement 27 is closed, and is deactivated if the series-connected switch of the switch arrangement 27 is opened. In the example in accordance with FIG. 10, all the current mirror transistors $26_1$-$26_m$ are deactivatable. However, this is just one example. In accordance with a further example (not illustrated), it is also possible for one of the current mirror transistors $26_1$-$26_m$ to be permanently activated, for example by no switch being connected in series with the current mirror transistor.

The converter 2 illustrated in FIG. 10 in addition comprises a resistor 25 connected in series with the current mirror arrangement 26, wherein a voltage across the resistor 25 forms a comparison signal Vptat(i). This comparison signal Vptat(i) is proportional to a current Iptat(i) provided by the current mirror arrangement 26, wherein this current Iptat(i) is in turn proportional to the current Iptat representing the second temperature-dependent signal. For the comparison signal it holds true in this case that $$Vptat(i)=R25 \cdot Iptat(i)=R25 \cdot k(i) \cdot Iptat \quad (16),$$

where a proportionality factor in the sense of Equation (3) is given in this case by $$p(i)=R25 \cdot k(i) \quad (17),$$

where R25 is a resistance value of the resistor 25 and k(i) is a proportionality factor that is adjustable by respective activation or deactivation of individual current mirror transistors from among the current mirror transistors $26_1$-$26_m$ by the evaluation circuit 3. The current mirror transistors $26_1$-$26_m$ can be realized in such a way that for providing each of the plurality of comparison signals Vptat(1)-Vptat(n), only one of the current mirror transistors $26_1$-$26_m$ is activated in each case, or can be realized in such a way that for providing at least some of the plurality of comparison signals Vptat (1)-Vptat(n), two or more of the current mirror transistors $26_1$-$26_m$ are activated in each case.

Some of the aspects explained above are summarized below on the basis of numbered examples.

Example 1. Method comprising: providing a first temperature-dependent signal having a first temperature coefficient; providing a second temperature-dependent signal having a second temperature coefficient; generating a plurality of comparison signals on the basis of the second temperature-dependent signal, wherein each of the plurality of comparison signals represents a respective temperature; comparing the first temperature-dependent signal with at least one of the plurality of comparison signals; and outputting temperature information on the basis of the comparing.

Example 2. Method according to claim 1, wherein the comparison signals are generated such that they represent a group of equidistant temperatures.

Example 3. Method according to claim 1 or 2, wherein the first temperature-dependent signal is a temperature-dependent voltage, and wherein the first temperature coefficient is negative.

Example 4. Method according to any of the preceding claims, wherein the second temperature-dependent signal is a temperature-dependent current, and wherein the second temperature coefficient is positive.

Example 5. Method according to claims 3 and 4, wherein the first temperature-dependent signal and the second temperature-dependent signal are generated by a single temperature sensor.

Example 6. Method according to any of claims 1 to 5, wherein the second temperature-dependent signal is a current, wherein generating the plurality of comparison signals comprises conducting the current through a series circuit having resistors, and wherein each of the plurality of comparison signals is a voltage across at least one of the resistors of the series circuit.

Example 7. Method according to claim 6, wherein each of the plurality of comparison signals is a voltage across in each case exactly one of the resistors of the series circuit.

Example 8. Method according to claim 6, wherein at least one of the plurality of comparison signals is a voltage across at least two of the resistors of the series circuit.

Example 9. Method according to any of claims 1 to 5, wherein the second temperature-dependent signal is a current, and wherein generating the plurality of comparison signals comprises generating a plurality of comparison currents on the basis of the second temperature-dependent signal and generating a plurality of comparison voltages on the basis of the plurality of comparison currents.

Example 10. Method according to any of claims 1 to 5, wherein generating the plurality of comparison signals comprises charging a first capacitor to a voltage dependent on the second temperature-dependent signal and partly discharging the first capacitor by connecting in parallel a capacitor arrangement having an adjustable capacitance.

Example 11. Method according to any of claims 1 to 10, wherein comparing the first temperature-dependent signal with at least of the plurality of comparison signals comprises temporally successively comparing at least two of the plurality of comparison signals with the first comparison signal.

Example 12. Method according to any of claims 1 to 10, wherein comparing the first temperature-dependent signal with at least one of the plurality of comparison signals comprises simultaneously comparing at least two of the plurality of comparison signals with the first comparison signal.

Example 13. Electronic circuit comprising: a temperature sensor configured to provide a first temperature-dependent signal having a first temperature coefficient, and to provide a second temperature-dependent signal having a second temperature coefficient; a converter configured to generate a plurality of comparison signals on the basis of the second temperature-dependent signal, wherein each of the plurality of comparison signals represents a respective temperature; an evaluation circuit configured to compare the first temperature-dependent signal with at least one of the plurality of comparison signals and to output temperature information on the basis of the comparing.

Example 14. Electronic circuit according to claim 13, wherein the second temperature-dependent signal is a temperature-dependent current, wherein the converter comprises a series circuit having a plurality of resistors, said series circuit being configured to obtain the temperature-dependent current, and wherein each of the plurality of comparison signals is a voltage across at least one of the resistors of the series circuit.

Example 15. Electronic circuit according to claim 13 or 14, wherein the second temperature-dependent signal is a temperature-dependent current, and wherein the converter comprises: a current mirror configured to generate a plurality of comparison currents on the basis of the temperature-dependent current; and at least one resistor connected in series with the current mirror.

Example 16. Electronic circuit according to claim 13 or 14, wherein the second temperature-dependent signal is a temperature-dependent current, and wherein the converter comprises: a first capacitor configured to be charged to a voltage dependent on the second temperature-dependent signal; and a capacitor arrangement having an adjustable capacitance, which is configured to be connected in parallel with the first capacitor.

Example 17. Electronic circuit according to any of claims 13 to 16, wherein the converter is configured to generate the plurality of comparison signals such that the comparison signals represent a group of equidistant temperatures.

The invention claimed is:

1. A method comprising:
providing a first temperature-dependent signal having a first temperature coefficient, wherein the first temperature-dependent signal is a temperature-dependent voltage, and wherein the first temperature coefficient is negative;
providing a second temperature-dependent signal having a second temperature coefficient;
generating a plurality of comparison signals on the basis of the second temperature-dependent signal, wherein each of the plurality of comparison signals represents a respective temperature;
comparing the first temperature-dependent signal with at least one of the plurality of comparison signals; and
outputting temperature information on the basis of the comparing.

2. The method according to claim 1,
wherein the comparison signals are generated such that they represent a group of equidistant temperatures.

3. The method according to claim 1,
wherein the second temperature-dependent signal is a temperature-dependent current, and
wherein the second temperature coefficient is positive.

4. The method according to claim 3,
wherein the first temperature-dependent signal and the second temperature-dependent signal are generated by a single temperature sensor.

5. The method according to claim 1,
wherein the second temperature-dependent signal is a current,
wherein generating the plurality of comparison signals comprises conducting the current through a series circuit having resistors, and
wherein each of the plurality of comparison signals is a voltage across at least one of the resistors of the series circuit.

6. The method according to claim 5,
wherein each of the plurality of comparison signals is a voltage across in each case exactly one of the resistors of the series circuit.

7. The method according to claim 5,
wherein at least one of the plurality of comparison signals is a voltage across at least two of the resistors of the series circuit.

8. The method according to claim 1,
wherein the second temperature-dependent signal is a current, and
wherein generating the plurality of comparison signals comprises generating a plurality of comparison currents on the basis of the second temperature-dependent signal and generating a plurality of comparison voltages on the basis of the plurality of comparison currents.

9. The method according to claim 1,
wherein generating the plurality of comparison signals comprises charging a first capacitor to a voltage dependent on the second temperature-dependent signal and partly discharging the first capacitor by connecting in parallel a capacitor arrangement having an adjustable capacitance.

10. The method according to claim 1,
wherein comparing the first temperature-dependent signal with at least one of the plurality of comparison signals comprises temporally successively comparing at least two of the plurality of comparison signals with the first comparison signal.

11. The method according to claim 1,
wherein comparing the first temperature-dependent signal with at least one of the plurality of comparison signals comprises simultaneously comparing at least two of the plurality of comparison signals with the first comparison signal.

12. An electronic circuit comprising:
a temperature sensor configured to provide a first temperature-dependent signal having a first temperature coefficient, and to provide a second temperature-dependent signal having a second temperature coefficient, wherein the second temperature-dependent signal is a temperature-dependent current;
a converter configured to generate a plurality of comparison signals on the basis of the second temperature-dependent signal, wherein each of the plurality of comparison signals represents a respective temperature, wherein the converter comprises a series circuit having a plurality of resistors, said series circuit being configured to obtain the temperature-dependent current, and wherein each of the plurality of comparison signals is a voltage across at least one of the resistors of the series circuit;
an evaluation circuit configured to compare the first temperature-dependent signal with at least one of the plurality of comparison signals and to output temperature information on the basis of the comparing.

13. The electronic circuit according to claim 12,
wherein the converter is configured to generate the plurality of comparison signals such that the comparison signals represent a group of equidistant temperatures.

14. A method comprising:
providing a first temperature-dependent signal having a first temperature coefficient;
providing a second temperature-dependent signal having a second temperature coefficient, wherein the second temperature-dependent signal is a temperature-dependent current, and wherein the second temperature coefficient is positive;
generating a plurality of comparison signals on the basis of the second temperature-dependent signal, wherein each of the plurality of comparison signals represents a respective temperature;
comparing the first temperature-dependent signal with at least one of the plurality of comparison signals; and
outputting temperature information on the basis of the comparing.

15. A method comprising:
providing a first temperature-dependent signal having a first temperature coefficient;
providing a second temperature-dependent signal having a second temperature coefficient, wherein the second temperature-dependent signal is a current;
generating a plurality of comparison signals on the basis of the second temperature-dependent signal, wherein each of the plurality of comparison signals represents a respective temperature, wherein generating the plurality of comparison signals comprises conducting the current through a series circuit having resistors, and wherein each of the plurality of comparison signals is a voltage across at least one of the resistors of the series circuit;
comparing the first temperature-dependent signal with at least one of the plurality of comparison signals; and
outputting temperature information on the basis of the comparing.

16. A method comprising:
providing a first temperature-dependent signal having a first temperature coefficient;
providing a second temperature-dependent signal having a second temperature coefficient, wherein the second temperature-dependent signal is a current;
generating a plurality of comparison signals on the basis of the second temperature-dependent signal, wherein each of the plurality of comparison signals represents a respective temperature, wherein generating the plurality of comparison signals comprises generating a plurality of comparison currents on the basis of the second temperature-dependent signal and generating a plurality of comparison voltages on the basis of the plurality of comparison currents;
comparing the first temperature-dependent signal with at least one of the plurality of comparison signals; and
outputting temperature information on the basis of the comparing.

* * * * *